(12) United States Patent
Brevoord et al.

(10) Patent No.: US 8,795,392 B2
(45) Date of Patent: Aug. 5, 2014

(54) CATALYTIC HYDRODEOXYGENATION OF AN OXYGENATE FEEDSTOCK

(75) Inventors: Eelko Brevoord, Amersfoort (NL); Robertus Leliveld, Utrecht (NL); Stephan Janbroers, Diemen (NL)

(73) Assignee: Albemarle Netherlands B.V., Amersfoort (NL)

( * ) Notice: Subject to any disclaimer, the term of this patent is extended or adjusted under 35 U.S.C. 154(b) by 860 days.

(21) Appl. No.: 11/911,168

(22) PCT Filed: Jun. 6, 2007

(86) PCT No.: PCT/EP2007/055563
§ 371 (c)(1),
(2), (4) Date: Nov. 12, 2009

(87) PCT Pub. No.: WO2007/141293
PCT Pub. Date: Dec. 13, 2007

(65) Prior Publication Data
US 2010/0043278 A1    Feb. 25, 2010

(30) Foreign Application Priority Data
Jun. 9, 2006   (EP) .................................... 06076202

(51) Int. Cl.
*C10L 1/188*   (2006.01)
(52) U.S. Cl.
USPC .......................................................... 44/308
(58) Field of Classification Search
USPC ............................... 585/331; 502/204; 44/308
See application file for complete search history.

(56) References Cited

U.S. PATENT DOCUMENTS

| 4,357,263 A | 11/1982 | Heck et al. |
| 4,992,605 A | 2/1991 | Craig et al. |
| 6,037,300 A * | 3/2000 | Kasztelan et al. ............ 502/204 |
| 2007/0135669 A1 * | 6/2007 | Koivusalmi et al. .......... 585/331 |

FOREIGN PATENT DOCUMENTS

| EP | 0 848 992 A1 | 6/1998 |
| EP | 0848992 * | 6/1998 |
| WO | WO 2007/068795 A1 | 6/2007 |
| WO | WO 2007/068796 A2 | 6/2007 |
| WO | WO 2007/068800 A2 | 6/2007 |

OTHER PUBLICATIONS

O. I. Senol, et al; "Effect of Sulphiding Agents on the hydrodeoxygenation of Aliphatic Esters on Sulphided Catalysts"; Applied Catalysis A:General; 2007; p. 236-244; vol. 326; Elsevier B.V.; Amsterdam, Netherlands.

(Continued)

*Primary Examiner* — Prem C Singh
*Assistant Examiner* — Chantel Graham
(74) *Attorney, Agent, or Firm* — Nathan C. Dunn; James A. Jubinsky; Marcy M. Hoefling

(57) ABSTRACT

A method for the hydrodeoxygenation of an oxygenate feedstock comprising contacting the feedstock with a sulphided catalyst composition under hydrodeoxygenation conditions, wherein the catalyst composition comprises: i) a porous carrier substantially comprised of alumina, the carrier comprising between about 0.001 and about 1 wt. % phosphorous and between about 0.001 and about 1 wt. % silicon (both calculated as oxides) and having a mean pore diameter in the range from about 5 nm to about 40 nm; and, ii) from about 1 to about 20 wt. % of an active metal component (calculated as oxides based on the weight of the composition) borne on said porous carrier and which comprises at least one Group VIB metal and at least one Group VIII metal.

14 Claims, 1 Drawing Sheet

(56) References Cited

OTHER PUBLICATIONS

O.I. Senol, et al; "Hydrodeoxygenation of Methyl Esters on Sulphided NiMo/y-Al2O3 and CoMo/y-Al2O3 Catalysts"; Catalysis Today; 2005; p. 331-335; vol. 100; Elsevier B.V.; Amsterdam, Netherlands.

O.I. Senol, et al; "Hydrodeoxygenation of Aliphtic Esters on Sulphided NiMo/y-Al2O3 and CoMo/y-Al2O3 Catalyst: The Effect of Water"; Catalysis Today; 2005; p. 186-189; vol. 106; Elsevier B.V.; Amsterdam, Netherlands.

O.I. Senol, et al; "Reactions of Methyl Heptanoate Hydrodeoxygenation on Sulphided Catalysts"; Journal of Molecular Catalysis A:Chemical; 2007; p. 1-8; vol. 268; Elsevier B.V.; Amsterdam, Netherlands.

Etienne Laurent, et al; "Study of the Hydrodeoxygenation of Carbonyl, Carbodylic and Guaiacyl Groups Over Sulfided CoMo/y-Al2O3 and NiMo/y-Al2O3 Catalysts. I. Catalytic Reaction Schemes"; Applied Catalysis A; 1994; p. 77-96; vol. 109; Elsevier Science B.V.; Amsterdam, Netherlands.

* cited by examiner

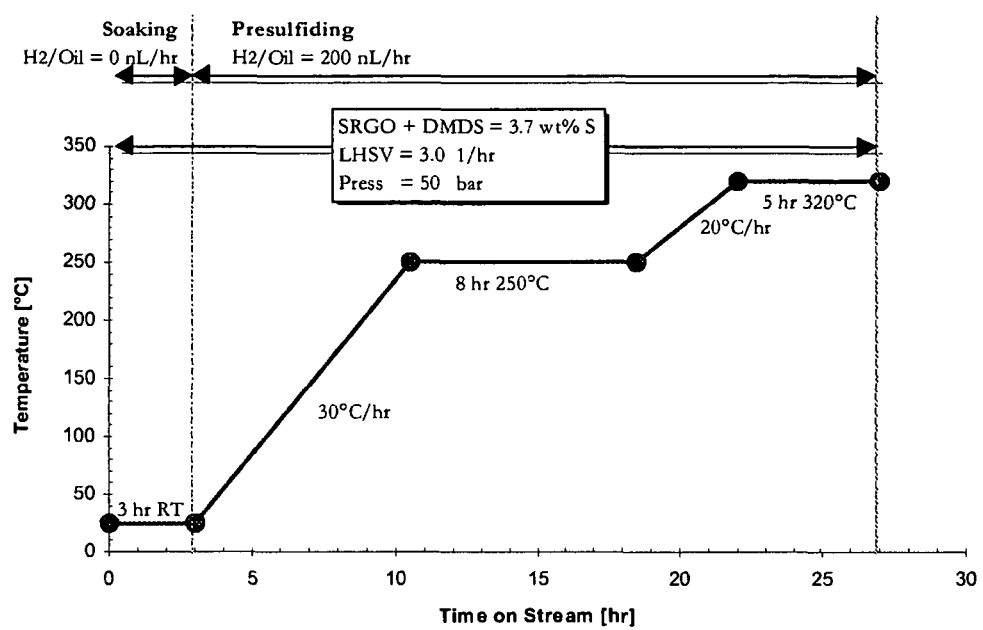

CATALYTIC HYDRODEOXYGENATION OF AN OXYGENATE FEEDSTOCK

REFERENCE TO RELATED APPLICATION

This Application is a 371 of PCT/EP2007/055563, filed on Jun. 6, 2007, which claims priority to EP Application No. 06076202.8 filed on Jun. 9, 2006, now abandoned.

TECHNICAL BACKGROUND OF THE INVENTION

This invention is concerned with a catalyst composition and its use in the hydroprocessing of oxygenate feedstocks. More particularly, this invention is directed to a catalyst composition comprising an active metal component dispersed on a porous carrier of low acidity and wide pores, and to the use of said catalyst composition in the hydrodeoxygenation of oxygenate feedstocks of biological origin.

DESCRIPTION OF THE PRIOR ART

Given the environmental and fiscal importance of limiting net carbon release from industrial processes, the partial or complete replacement of petroleum-derived products with synthetic products is being extensively investigated. Fuels and other derivatives from biological sources—including harvested crops and crop wastes—now represent an important subset of such synthetic products. It has therefore become crucial to develop efficient processes for the extraction of utile products from such biological sources.

A number of prior art references have taught that hydrodenitrification (HDN), hydrodesulphurisation (HDS), hydrodeoxygenation (HDO) and hydrodemetallization of petroleum-based hydrocarbon feedstocks can be effected by contacting said feedstocks with catalytically active metal components comprised of metals from Group VIB and Group VIII of the Periodic Table. Such active metals are deposited (usually by impregnation) onto bases or supports composed of porous materials such as silica, silica-alumina, thoria, titania and silica-titania. The pore structure of the support, and the form and amount of the metals present have been optimized for different hydroprocesses and for different quality petroleum feedstocks.

Given that liquefied biomass contains an abundance of oxygen-containing molecules, it is clear that efficient catalytic hydrodeoxygenation (HDO) would be desirable for the derivation of utile fuels and chemicals therefrom. However, very limited attention has been given to the use and optimization of Group VIB and Group VIII active metal catalysts for the hydroprocessing of biologically derived hydrocarbon feedstocks.

References such as U.S. Pat. No. 4,313,852 have contended that the full activity of active metal components—and in particular molybdenum and tungsten—in inter alia hydrodeoxygenation reactions is only achieved when they are in the sulphided state. However, as liquefied biomass does not usually contain sulphur compounds, catalysts comprising sulphided active metal compounds tend to be relatively unstable as the sulphided compounds breakdown to their oxide forms. There is therefore a need in the art to provide sulphided catalysts of improved stability to enable their effective use in the hydrodeoxygenation of oxygenate feedstocks of biological origin.

During hydrodeoxygenation of any oxygenate feedstock, carbonaceous deposits can accumulate within porous catalysts. This reduces the effective pore volume through which the feedstock components must diffuse and also reduces the exposed, effective surface area of the supported active metals. These effects combine to reduce catalytic efficiency over time. As a consequence, it has become common practice to regenerate the catalysts by removing them from the active hydrodeoxygenation zone and continuously introducing them—typically as a moving bed—into a regeneration zone. Here the catalysts are treated to remove carbonaceous materials therefrom, typically by burning them off at a high concomitant energetic cost.

Although the catalysts generated by this combustion will be functional when returned to the hydrodeoxygenation zone, they may not achieve the same efficiency as "fresh" catalysts; the process of regeneration can result in the entrainment of oxygen molecules either within the pores of the catalyst or interstitially between the catalyst particles and these oxygen molecules can reduce the activity and selectivity of the porous material during hydrodeoxygenation. Although literature such as US Patent Application Publication No. 2002/215840 (Beech et al.) describes methods for removing this entrained oxygen, the additional steps involved further increase the complexity and energetic requirements of the overall hydrodeoxygenation process.

It would therefore be advantageous to use a catalyst in the hydrodeoxygenation of oxygenate feedstocks of biological origin which is characterized by a limited build up of coke and other carbonaceous deposits within its pore structure.

SUMMARY OF THE INVENTION

These and other needs in the art are met by the present invention which provides a method for the hydrodeoxygenation of an oxygenate feedstock comprising contacting said feedstock with a sulphided catalyst composition under hydrodeoxygenation conditions, wherein said catalyst composition comprises: i) a porous carrier substantially comprised of alumina, said carrier comprising between about 0.001 and about 1 wt. % phosphorous and between about 0.001 and about 1 wt. % silicon (both calculated as oxides) and having a mean pore diameter in the range from about 5 to about 40 nm; and, ii) from about 1 to about 20 wt. % of an active metal component (calculated as oxides based on the weight of the composition) borne on said porous carrier and which comprises at least one Group VIB metal and at least one Group VIII metal. Preferably said carrier has a mean pore diameter in the range from about 10 to about 20 nm.

The term "oxygenate" as used herein denotes a hydrocarbonaceous compound that includes at least one oxygen atom. It is envisaged that this process may be employed for any suitable oxygenate feed and is particularly directed to those of biological origin. Preferably, however, the oxygenate feedstock is characterized by comprising triglycerides and/or the oxygenated reaction products of triglycerides which have been subjected to one or more hydroprocessing steps prior to contacting the hydrodeoxygenation catalysts. Such triglycerides may suitably be derived from fish, animal or vegetable oils. Where one or more preceding hydroprocessing steps are employed on said triglycerides, it is preferable that these steps comprise transesterification; in such an embodiment, the oxygenate feedstock comprises at least about 10 wt. %, more preferably at least about 50 wt. % and most preferably at least about 75 wt. % of esters derived from the triglycerides.

Typical hydrodeoxygenation conditions include a temperature in the range from about 250° to about 450° C., a hydrogen partial pressure in the range from about 10 to about 220 bar and a liquid hourly space velocity (LHSV) in the range from about 0.1 to about 10 $hr^{-1}$. In defining the hydrodeoxygenation conversion of the process of this invention as the conversion of (organically) bound oxygen to $H_2O$, under these conditions conversion of at least about 85% and typically at least about 90% may be achieved.

In order to retain the metal component of the catalyst in their sulphided form—instead of converting back into their metal oxide form—it is preferred that said oxygenate feedstock is contacted with the catalyst composition in the presence of hydrogen sulphide ($H_2S$) or a precursor thereof, such that said hydrogen sulphide is present in the hydrogen gas in an amount between about 10 ppm and about 10000 ppm, preferably between about 10 ppm and about 1000 ppm.

The catalyst composition of this invention is characterized by a low loading of the active metal components, with the preferred metal content of the catalyst composition being in the range from about 5 to about 20 wt. %. For the hydrodeoxygenation function, this low loading does not sacrifice catalytic activity. It has been found that the catalyst compositions used in this invention may achieve a hydrodeoxygenation activity—defined as one minus the fraction of oxygen left in the reaction product compared to the oxygenate feedstock—of greater than 12 gram oxygen per unit gram of said active metal component per hour (gO/gM/hr) when employed under hydrodeoxygenation conditions comprising a rapeseed oil feedstock characterized by a sulphur content less than 2 mg/Kg and a nitrogen content less than 10 mg/Kg; a temperature of about 300° C.; a hydrogen partial pressure of about 50 Bar; a $H_2$/oil ratio of 1000 mL/L; and, a liquid hourly space velocity of about 5 $hr^{-1}$; and, a feed recycle ratio of about 5.

The low percentage by weight (based on the overall weight of the catalyst) of the active metals also limits the "clumping" or uneven distributions of these components and therefore facilitates efficient co-action of the two or more metal components.

Any combination of Group VIB and Group VIII metal is envisaged of use in the catalyst composition. However, in accordance with a preferred embodiment of the invention, the Group VIB metal of the catalyst composition comprises molybdenum (Mo) and/or the Group VIII metal of the catalyst composition comprises nickel (Ni). More particularly, it is preferable that the active metal component of the catalyst composition comprises from about 10 to about 18 wt. % molybdenum and from about 2 to about 5 wt. % nickel. Within those ranges, or independently thereof, it is further preferred that said active metal component of the catalyst composition is characterized by a weight ratio of Mo/Ni in the range from about 4:1 to about 2:1.

For certain applications of this catalyst, the acidity of the alumina porous carrier should be maintained at a low level. In accordance with a preferred embodiment of the invention this low acidity is achieved by employing a porous alumina carrier comprising less than about 0.5 wt. % and more preferably less than about 0.1 wt. % phosphorous; and/or, less than about 0.5 wt. % and more preferably less than about 0.1 wt. % silicon (both calculated as oxides based on the weight of the composition).

DEFINITIONS

As used herein, the term "metal" refers to a metal that: (a) is present on the internal surface of the essentially alumina macrostructure or the external surface of the macrostructure, or both; and (b) affects the catalytic properties of the particles of the macrostructure or affects the adsorptive properties of the particles of the macrostructure, or both. The term "metal" does not encompass metal from which the porous inorganic material is comprised. For example, in the case of crystalline microporous molecular sieves, the term "metal" does not encompass any metal in the framework of the crystalline molecular sieve.

The amounts of metals may be measured by atomic absorption spectroscopy, inductively coupled plasma-atomic emission spectrometry or other methods specified by ASTM for individual metals.

The expression "total volume", as used herein, means the volume displaced by macrostructure material if all pores within the macrostructure were filled with non-porous material.

In the context of the present specification the "average pore diameter" is defined as the pore diameter at which half of the pore volume of the catalyst is present in pores with a diameter below this value and the other half of the pore volume is present in pores with a diameter above this value. The pore size distribution from which this date is derived is determined by way of mercury intrusion at a contact angle of 140° C.

Procedures for determining the density, mesoporosity, microporosity, and particle size distribution of the essentially macrostructure are know to persons skilled in the art. Examples of such procedures are described in Handbook of Heterogeneous Catalyst by G. Ertl, H. Knozinger, and J. Weitkamp (1997).

BRIEF DESCRIPTION OF THE DRAWINGS

FIG. 1 illustrates a heating regime that may be employed in the presulfiding of a catalyst composition according to a preferred embodiment of this invention.

DETAILED DESCRIPTION OF THE INVENTION

The Catalyst Composition

The alumina carrier for use in the hydrodeoxygenation catalyst may be produced using any known method which can effect adequate control of the specific surface area, pore volume and pore size distribution of said alumina. Suitable methods are thereby described in: Japanese Patent Laid-Open Publication No. 71456/1971 and Japanese Patent Publication No. 26512/1986 carrier (wherein the alumina is obtained from pseudoboehmite prepared by hydrolysis of an aluminum salt); Japanese Patent Publication No. 166220/1985, Japanese Patent Laid-Open Publication No. 24824/1993, Japanese Patent Publication No. 166220/1985, Japanese Patent Laid-Open Publication No. 24824/1993, Japanese Patent Publication No. 166220/1985, Japanese Patent Laid-Open Publication No. 10535/1995, and U.S. Pat. No. 2,915,475 wherein the alumina source is variously an aqueous alumina sol, a gel obtained by hydrolysis of an aluminum salt, metallic aluminum or an aluminum alkoxide. Furthermore, US Patent Application No. 2003/044348 describes a process for preparing a specific alumina composition mixing in the presence of water an acid-containing aluminum hydroxide, an acid-containing alumina obtained by treating activated alumina in the presence of a monobasic acid or its salt, bayerite and [gamma]-alumina; the mixture is then subjected to a sol-forming reaction through hydrothermal synthesis, neutralization, hydrothermal treatment, drying, calcining and the like. US Patent Application Publication No. 2005079126 (Le Loarer et al) describes the production of aggregated alumina carrier materials by dehydrating aluminium oxyhydroxide or hydroxide, agglomerating the alumina thus obtained, and then hydrothermally treating and calcining these agglomerates. The disclosure of all these document is hereby incorporated by reference.

It is envisaged that the alumina carrier can have either a modal or bimodal pore size distribution, although the former is preferred in this application. U.S. Pat. No. 6,919,294 inter alia describes a method for producing a hydrorefining catalyst which contains hydrogenation-active metal and an inorganic oxide carrier predominantly of alumina which has such a bimodal pore characteristic. Accordingly the disclosure of this document is incorporated herein by reference.

Irrespective of the actual method used to derive the alumina carrier it is important to this invention that the carrier is of low acidity and, more particularly, that the phosphorous and silicon contents of the alumina carrier are independently between about 0.001 and about 1 wt. % (calculated as oxides and based on the weight of the catalyst composition). Preferably, the alumina carrier of the catalyst composition comprises less than about 0.5 wt. % of one or both of silicon and phosphorous and more preferably less than about 0.1 wt. % thereof. Most preferably, the alumina carrier of said catalysts is essentially free of silicon or phosphorous.

The derivation of such carriers may be achieved through the purity of the aluminium sources used in the above referenced methods. Alternatively, where necessary the low acidity of the alumina carrier can be controlled by adding promoters and/or dopants. Examples of promoters and/or dopants include halogens, especially fluorine, boron, yttria, rare-earth oxides and magnesia. Promoters such as halogens generally increase the acidity of metal oxide supports while mildly basic dopants such as yttria or magnesia tend to decrease the acidity of such supports.

The components of the feedstock which is to be hydrodeoxygenated should diffuse through the pores in the catalyst. The pore diameter and pore volume of the inorganic carrier must of course be selected to provide this catalyst accessibility, but these parameters also determine: the bulk density and breakage strength of the catalyst and thereby the life of the catalyst when loaded in bulk into a reactor; the degree to which the precipitation of contaminants precipitate on the catalyst over a given period of time; and, the ratio of surface area to pore volume which determines catalyst activity.

The carrier included in the catalyst composition of the present invention has a mean pore diameter from about 5 to about 40 nm, preferably about 8 to about 30 nm and more preferably about 10 to about 20 mm. The carrier should preferably have between about 1 and about 30% of its pore volume in pores with a diameter above 10 m, preferably about 1 to about 20% and more preferably about 1 to about 10%.

The Group VIB metal of the catalyst composition is preferably selected from the group consisting of molybdenum, tungsten or mixtures thereof, with molybdenum being particularly preferred. The Group VIB metal is preferably present in an amount from about 10 to about 18 wt. % [calculated as trioxide].

The Group VIII metal of the catalyst composition is preferably selected from the group consisting of nickel, cobalt or mixtures thereof, with nickel being particularly preferred. The Group VIII metal is preferably present in an amount from about 0.1 to about 10 wt. % [calculated as oxide], more preferably from about 0.1 to about 7 wt. % and most preferably about 2.0 to about 5.0 wt. %.

In accordance with a preferred embodiment of the invention, the active metal component of the catalyst composition comprises from about 10 to about 18 wt. % molybdenum (calculated as trioxide) and from about 2.0 to about 5.0 wt. % nickel (calculated as oxide). In the presence of other Group VIB and Group VIII metals or otherwise, it is also preferred that the catalyst composition is characterized by an Mo/Ni ratio by weight in the range from about 4:1 to about 2:1.

Any method of which can incorporate the metal components on the alumina carrier such that the catalytically-active material is distributed over the carrier material in a very finely divided form—thus maximizing the surface area per unit mass of active metal—is suitable for use in the preparation of catalysts according to this invention.

A usual method for distributing catalytically active material over the surface of particulate carrier material comprises impregnating the carrier material with a solution of a precursor of the desired metal-containing catalytically-active material and subsequently drying and calcining the impregnated carrier material whereby the deposited metal-containing material is converted into the corresponding metal oxide. The support particles may be impregnated in one or more steps with a solution containing precursors of the metal component. For the Group VIB metals, ammonium heptamolybdate, ammonium dimolybdate, and ammonium tungstenate may be suitable precursors. For the Group VIII metals, nickel nitrate and cobalt nitrate may be mentioned. The impregnating solution may contain a phosphorus compound, such as phosphoric acid, to enhance the stability of the solution. Other compounds of which the use is known in the art, such as citric acid, may also be present.

After an optional drying step at a temperature in the range between about 25° C. and about 200° C., the resulting material is calcined for a period of up to about 2 hours at a temperature in the range between about 350° C. and about 750° C. in order to convert at least part, but preferably all, of the metal component precursors into oxide form.

A person of ordinary skill in the art would be aware of a wide range of variations on this method. For example, it is possible to apply a plurality of impregnating steps, the impregnating solutions to be used containing one or more of the component precursors that are to be deposited, or a portion thereof. Alternatively, dipping methods and spraying methods can be used in place of impregnation techniques. Where multiple impregnation, dipping, and drying steps are employed, calcination can be carried out after each separate step.

A further known process for finely and homogeneously distributing nickel and cobalt—as the catalytically-active metals—over the essentially alumina carrier comprises suspending the carrier material in a solution of a complex metal amine carbonate. The resulting suspension is then heated (with agitation), decomposing the metal ammine carbonate into insoluble metal carbonate or basic metal carbonate which precipitates on the suspended carrier material. By further heating and, if necessary, reducing, the said carbonate can be converted to the metal oxide or elemental metal, respectively.

This method is not preferred in the present invention for the following reason. The method requires the use of a high ammonia concentration in order to obtain the ammine carbonates in soluble form; the concomitant high pH will partially dissolve the alumina carrier. When the ammonia is removed—which removal is required to permit decomposition of the metal amine carbonate—the pH of the solution drops. The dissolved part of the carrier material will then precipitate and envelop the deposited particles of active material which thereby becomes inactivated. The significance of this effect is therefore heightened where low active metal concentrations are to be employed.

A more suitable "suspension" technique is, however, described in UK Patent No. GB 1220105 (Stamicarbon).

The derived catalyst particles may have many different shapes. Suitable shapes include cylinders, spheres, rings, and symmetric and asymmetric polylobes, for instance tri- or quadrulobes. It will of course be recognized that these shapes may be defined using the parameters of length, width and/or diameter; for a given particle shape however, it is preferred that each of these parameters is in the range from about 1 to about 50 mm.

The (partial or whole) conversion of the active metal components of the catalyst into their sulphidic form—prior to the use of the catalyst in the hydrotreatment of feedstocks—may be done in any conventional manner that allows for the equilibration at each stage of conversion from the oxidic to sulphidic forms. Techniques which do not allow for this equilibration are unsuitable as they may lead to a loss of dispersion of the metal sulfides and consequent loss of catalytic activity.

For example, the catalyst may be pre-sulphided in situ (in the reactor) with a mixture of hydrogen and hydrogen sulphide—optionally further diluted with nitrogen or a flue gas—at a temperature between about 200° and about 500° C. for a period from about 1 to about 10 hours. Alternatively, the catalyst may be presulphided with $CS_2$ in n-hexane under hydrogen at a pressure between about 1 and about 10 MPa and a temperature between about 200° and about 300° C.

In accordance with a preferred embodiment of this invention, the catalysts are presulphided using dimethylssulphide (DMDS) spiked SRGO (S=3.7 wt. %). Soaking is effected at about 50 Bar $H_2$-pressure and maintained for about 3 hours with a liquid hourly space velocity (LHSV) of about 3.0 $hr^{-1}$.

FIG. 1 appended hereto illustrates a preferred embodiment of the conditions under which the catalyst is subjected to soaking and presulphiding.

The Oxygenate Feedstock

Triglycerides of biological origin may suitably be derived from fish, animal and vegetable oils. Particularly useful sources of triglycerides (which may be used alone or in combination) include coconut oil, palm oil, palm kernel oil, safflower oil, sesame oil, soybean oil, rapeseed oil, corn oil, mustard oil, sunflower oil, yellow grease, trap grease, lard, edible tallow, inedible tallow and mixtures thereof. Of these, the most preferred source is rapeseed oil.

As biological sources of triglycerides vary in their levels of impurities [such as free fatty acids (FFA), trace metals, phosphatides, carotenoids, aflotoxins, biocides and polychlorinated hydrocarbons], it may further be necessary to pre-treat the sources to remove these impurities prior to the transesterification step. The pre-treatment process actually applied will of course depend on the type of oil used but will generally comprise at least one process selected from the group consisting of degumming, deodorization (vacuum distillation), steam stripping, caustic stripping, solvent extraction and bleaching.

It is considered that the process of this invention may also comprise the further step of transesterification of the source of triglycerides, wherein said step precedes the hydrodeoxygenation step. The oxygenate product of the transesterification is thus contacted with the catalyst. The transesterification conditions—in particular temperature and the amounts of methanol, and bases (such as NaOH) present with the triglycerides—may be varied in accordance with the known art such that the oxygenate product comprises at least about 10 wt. %, more preferably at least about 50 wt. % and most preferably at least about 75 wt. % esters. [The disclosure of K. S. Tyson, "Biodiesel Technology & Feedstocks", Publication of National Renewable Energy Laboratory (NREL), 26 Mar. 2003 is herein incorporated by reference.] Further, said transesterification conditions are adjusted such that the oxygenate product substantially comprise methyl esters of the general formula Re—O—Me where R is a hydrocarbon moiety having a carbon number in the range from $C_{10}$ to $C_{50}$ and more preferably $C_{15}$ to $C_{40}$.

In this invention, the oxygenate feedstock may be in the liquid phase, the vapour phase or mixed vapour/liquid phase.

One or more inert diluents may optionally be added to the oxygenate feedstock to reduce the effective concentration thereof in the overall feed. The diluent(s) should generally be non-reactive with the feedstock or the porous carrier and thereby suitable diluents include helium, argon, nitrogen, carbon monoxide, carbon dioxide, hydrogen and water, of which the inert diluents are the most preferred. When present, diluents may constitute from about 1 to about 99 molar percent, preferably from about 1 to about 80 mol. %, more preferably from about 5 to about 50 mol. %, most preferably from about 5 to about 25 mol. % (based on the total number of moles of the feedstock and the diluent that are fed into the reaction zone or catalyst bed thereof).

The Hydrodeoxygenation Conditions

The oxygenate-containing feedstock together with the diluent where used—each component introduced separately or in some combination—is/are contacted with the catalyst composition at process conditions effective to hydrodeoxygenate said feedstock. The volume in which such contact takes place is herein termed the "reactor," which is a part of a "reactor apparatus" or "reaction system" or "reactor system." The "entrance of the reactor" is designated as the point of highest total pressure in the reactor where all or part of the oxygenate-containing feedstock encounter the catalyst composition.

If introduced to the reactor separately, it is important that the oxygenate and diluent come together prior to significant conversion of the oxygenate taking place. In this manner, the oxygenate and diluent will acquire their proper partial pressures in conducting the oxygenate conversion reaction.

The specific hydrodeoxygenation conditions of the present invention are controlled by adjusting one or more of the following: the reaction temperature and pressure; the feedstock composition; the effective amount of diluents used; the feedstock flow rate, that is the Liquid Hourly Space Velocity (LHSV); the specific reactor configuration; and, the level and extent of catalyst regeneration and/or re-circulation.

Typical hydrodeoxygenation conditions comprise a temperature in the range from about 250° C. to about 400° C., a hydrogen partial pressure from about 10 to about 220 bar and liquid hourly space velocity (LHSV) of about 0.1 to about 10 $hr^{-1}$. More preferably, the hydrodeoxygenation conditions comprise a temperature in the range from about 280° to about 380° C., a hydrogen partial pressure in the range from about 20 to about 100 bar and a liquid hourly space velocity in the range of about 0.2 to about 2 $hr^{-1}$.

In order to control the exotherm of the hydrodeoxygenation reaction some of the reaction product removed from the reaction zone should be recycled (such that the total feed rate is higher than the fresh feed rate). In this invention, it is preferred that the recycle ratio—defined as:

(Recycled Product Rate+Feed Rate)/Fresh Feed Rate is in the range from about 1 to about 10.

In accordance with a preferred embodiment of the invention the oxygenate feedstock is contacted with the catalyst in the presence of hydrogen sulphide ($H_2S$) or precursors thereof—in particular $CS_2$— such that the hydrogen sulphide is present in said hydrogen in an amount between about 10 ppm and about 2000 ppm, more preferably between about 10 ppm and about 1000 ppm.

Without being bound by theory, hydrodeoxygenation in the presence of hydrogen predominantly proceeds by hydrogenolysis (in which the oxygen in removed from the feedstock as water). The addition of hydrogen sulphide or precursors thereof at the defined levels suppresses hydrogenolysis and enhances other deoxygenation reactions (whereby oxygen is removed as carbon dioxide, carbon monoxide and/or sulphur dioxide); this can reduce the overall consumption of hydrogen during the HDO process. Where applicable, some $H_2S$ may act to maintain the hydrodeoxygenation catalyst in its active sulphided state.

The conversion of oxygenates may be carried out in a variety of catalytic reactors, including fluid bed reactors, countercurrent free fall reactors and concurrent riser reactors as described inter alia in U.S. Pat. No. 4,068,136 and in Fluidization Engineering, D. Kunii and O. Levenspiel, Robert E. Krieger Publishing Co. NY, 1977, which are herein incorporated by reference. Although any standard commercial scale reactor system can be used, including fixed bed or moving bed systems, it is preferable that the process is carried out in a dynamic bed system, and more preferably a dynamic bed system that is operable at high space velocities.

In the usage of a dense fluidized bed reactor with gas superficial velocities at or below about 1 m/s, in which the feed and reactant components are considered well mixed at all points in the reactor, the location at which the oxygenate and diluent are introduced to the reactor is of less concern. In the usage of a fixed bed reactor, or a fluidized bed reactor with gas superficial velocities above about 1 m/s, it is desirable that the oxygenate and diluent be introduced to the reactor in such a manner so as to assure no more than about 30% of the oxygenate is converted before the remaining oxygenate and diluent come together in the reactor. The methods for achieving depend upon the locations of introductory devices such as feed nozzles, and relative rates of introduction through such devices, and are well known to those skilled in the art.

The conversion of the oxygenates in any reactor employed should be maintained at a sufficiently high level to reduce both the amount of unwanted by-products and the extent of recycling of any unreacted feedstock. Generally, conversion levels of 50 mol %—with concomitant recycling of the remaining 50 mol %—are commercially acceptable. However, it is desirable to achieved conversion levels of greater than about 85 mol % and more preferably greater than about 98 mol % in order to simplify any recycling process. A person of ordinary skill in this art will be aware of a number of methods to maintain oxygenate conversions at such levels.

As carbonaceous deposits such as "coke" will form on the surface of or within the molecular sieve catalyst during the hydrodeoxygenation reaction, the catalyst is typically regenerated by burning off at least a portion of the coke deposits. Such regeneration occurs at times and conditions needed to maintain a level of activity of the entire catalyst within the reactor. Techniques for achieving this are described inter alia by Michel Louge, "Experimental Techniques," Circulating Fluidized Beds, Grace, Avidan, & Knowlton, eds., Blackie, 1997 (336-337), the description of which is incorporated herein by reference.

In an embodiment of this process, a portion of the coked catalyst composition is withdrawn from the reactor and introduced to a regeneration system. The regeneration system comprises a regenerator where the coked catalyst composition is contacted with a regeneration medium, preferably a gas that contains oxygen, under general regeneration conditions of temperature, pressure and residence time. The regeneration conditions are selected so that coke is burned from the coked catalyst composition to form a regenerated molecular sieve catalyst composition.

Non-limiting examples of the regeneration medium include one or more of oxygen, $O_3$, $SO_3$, $N_2O$, $NO$, $NO_2$, $N_2O_5$, air, air diluted with nitrogen or carbon dioxide, oxygen and water (see U.S. Pat. No. 6,245,703, incorporated herein by reference), carbon monoxide and/or hydrogen.

Regeneration temperatures can be in the range of from about 200° C. to about 1500° C., but are preferably in the range from about 450° C. to about 550° C. The regeneration pressure can be in the range of from about 15 psi (103 kPa) to about 500 psi (3448 kPa), preferably from about 20 psi (138 kPa) to about 250 psi (1724 kPa), more preferably from about 25 psi (172 kPa) to about 150 psi (1034 kPa), and most preferably from about 30 psi (207 kPa) to about 60 psi (414 kPa).

The preferred residence time of the catalyst composition in the regenerator is in the range of from about one minute to several hours, most preferably about one minute to about 100 minutes. The preferred volume of oxygen in the gas is in the range of from about 0.01 mole percent to about 5 mole percent based on the total volume of the gas.

Regeneration promoters may be added to promote the regeneration of the catalyst composition. Such promoters are typically metal containing compounds such as platinum, palladium and the like which may be added directly to the regenerator, or may be added indirectly, for example, with the coked catalyst composition.

In an embodiment, the regenerated catalyst composition has a coke level of less than about 2 wt. %, more preferably less than about 1 wt. % and more preferably less than about 0.5 wt. % based upon the total weight of the coked catalyst composition. However, the severity of regeneration can be controlled by one skilled in the art to provide a catalyst that retains some coking material, i.e. to obtain a partially regenerated catalyst, which has enhanced selectivation to light olefins during the oxygenates-to-olefins reaction.

The process may be carried out in a batch, semi-continuous or continuous fashion. The process can be conducted in a single reaction zone or a number of reaction zones arranged in series or in parallel.

Test Conditions for Determining Catalyst Activity

For the purpose of illustrating that the activity of the catalyst composition used herein is unexpectedly high—and may be comparable to catalyst of much higher metals loading—catalyst activity may be measured under specific "test conditions". These conditions represent a subset of the hydrodeoxygenation conditions under which the catalyst composition will typically be employed.

The catalyst compositions are in extrudate form and placed in a fixed bed reactor such that the mass of metals present in the catalyst composition is between about 135 and about 145 g per liter of reactor volume is determined. Although the shape and size of the catalysts could of course be optimized in the course of their industrial application, under these test conditions, the catalysts are employed in the common shapes of cylinders, trilobes and/or quadrulobes having diameters in the range from about 1 to about 6 mm. The catalysts are presulphided using DMDS spiked SRGO (S=3.7 wt. %). Soaking was done at 50 Bar $H_2$-pressure and maintained for 3 hours with a liquid hourly space velocity (LHSV) of 3.0 $hr^{-1}$.

Rapeseed oil feedstocks are employed as the test oxygenates and are characterized by a sulphur content less than 2 mg/Kg and a nitrogen content less than 10 mg/Kg. The hydrodeoxygenation conditions employed during the test comprise a temperature of about 300° C., a hydrogen partial pressure in the range of about 50 Bar, $H_2$/oil ratio of greater than about 1000 nL/L and a liquid hourly space velocity of about 5 $hr^{-1}$. A recycle ratio of 5 was employed. During the hydrodeoxygenation process the rapeseed oil is converted mainly to n-C17 and c-C18 paraffins with propane, water, carbon dioxide and carbon monoxide as by-products.

The catalyst activity is defined as one minus the fraction of oxygen left in the total liquid product compared to the oxygenate feedstock. The catalysts according to this invention are ideally characterized by an activity greater than 12, preferably greater than 15 and more preferably greater than 17 g O/g metal/hour.

The following examples further illustrate the preparation and use of the catalyst system according to the invention.

EXAMPLE 1

Two different catalysts were prepared having the properties shown in Table 1.

TABLE 1

|  | Catalyst A | Catalyst B |
| --- | --- | --- |
| NiO (wt. %) | 3.41 | 3.70 |
| $MoO_3$ (wt. %) | 13.2 | 12.1 |
| $MoO_3$ (g/liter) | 80.5 | 71.4 |
| $SiO_2$ (wt. %) | <0.1 | 1.00 |
| $P_2O_5$ (wt. %) | <0.1 | <0.1 |
| $N_2$-SA-BET ($m^2$/g) | 195 | 245 |
| $N_2$-PV-Ads (ml/g) | 0.6 | 0.70 |
| Mean Pore Diameter (Ang.) | 13.2 | 10.0 |
| Carrier Bulk Density | 0.64 | 0.57 |

Fifty milliliters of each catalyst was loaded into a fixed bed reactor. The hydrodeoxygenation performance was demonstrated by up-flow, side-by-side testing employing a rapeseed oil feedstock having the properties defined in Table 2 below:

TABLE 2

| Property of Feedstock | Parameter Value |
| --- | --- |
| Sulphur (mg/Kg) | 1.26 |
| Nitrogen (mg/Kg) | 9.0 |
| Oxygen (wt. %) | 10.59 |
| Carbon (wt. %) | 11.51 |
| Hydrogen (wt. %) | 10.59 |
| Density at 15.5° C. (kg/$m^3$) | 824.8 |
| TAN (mgKOH/g) | 0.14 |
| Bromine Number (g/100 g) | 57.7 |
| Viscosity at 50° C. ($mm^2$/s) | 25.32 |
| Cloudpoint ° C.(° F.) | 4 (39) |

Catalyst Presulphiding: DMDS spiked SRGO (S=3.7 wt. %) was used during presulphiding. Soaking was done at 50 Bar $H_2$-pressure and maintained for 3 hours with a liquid hourly space velocity (LHSV) of 3.0 $hr^{-1}$. After soaking $H_2$/Oil was set at 200 nL/L and the catalyst bed temperature was headed according to the program shown in the FIG. 1.

During the test the WABT was varied according to the Table 3:

TABLE 3

| Condition # | TOS (days) | WABT (° C.) |
| --- | --- | --- |
| 1 | 3 | 300 |
| 2 | 5 | 290 |
| 3 | 6 | 280 |
| 4 | 7 | 270 |
| 5 | 10 | 250 |
| 6 | 12 | 258 |
| 7 | 13 | 280 |
| 8 | 17 | 295 |
| 9 | 19 | 289 |
| 10 | 32 | 287 |
| 11 | 33 | 300 |
| 12 | 34 | 310 |

Other parameters were: LHSV=5 $hr^{-1}$ and a pressure of 50 bar. In order to lower the exotherm caused by hydrodeoxygenation active recycling was employed at a recycle ratio of 1:5 (fresh:total).

The results obtained from the performance of this hydrodeoxygenation process are shown in Table 4 below:

TABLE 4

| Result | Catalyst A | Catalyst B |
| --- | --- | --- |
| Start of Run (SOR) Conversion 280° C. | 99 | 86 |
| End of Run (EOR) Conversion 310° C. | 99 | 94 |
| Deact. ° C./month (calc.) | 9 | 14 |
| % Coke on Spent Catalyst | 7.3 | 10.5 |
| % Sulphur on Spent Catalyst | 6.5 | 6.5 |
| Averaged Activity of Catalysts (g O/g metals/hr) | 17.8 | 18.4 |

Both catalysts exhibit high activity despite their low metals loading. The deposition of coke on catalyst A was lower than that deposited on comparative catalyst B under the same hydrodeoxygenation conditions.

The invention is not limited to the above described embodiments thereof. The rights sought are rather defined in the following claims, within the scope of which many modifications can be envisaged.

The invention claimed is:

1. A method for the hydrodeoxygenation of an oxygenate feedstock comprising contacting a feedstock of biological origin with a sulphided catalyst composition under hydrodeoxygenation conditions, wherein the catalyst composition comprises:
    i) a porous carrier substantially comprised of alumina, the carrier comprising between about 0.001 to about 1 wt. % phosphorous and between about 0.001 and about 1 wt. % silicon (both calculated as oxides) and having a mean pore diameter in the range from about 5 nm to about 40 nm; and,
    ii) from about 1 to about 20 wt. % of an active metal component (calculated as oxides based on the weight of the composition) borne on the porous carrier and which comprises at least one Group VIB metal and at least one Group VIII metal.

2. A method according to claim 1, wherein the oxygenate feedstock comprises triglycerides.

3. A method according to claim 1, wherein the oxygenate feedstock comprises at least about 10 wt. % of esters.

4. A method according to claim 3, wherein the oxygenate feedstock comprises the reaction product of triglycerides which have been subjected to transesterification.

5. A method according to claim 1, wherein the hydrodeoxygenation conditions comprise a temperature in the range from about 250° to about 450° C, a hydrogen partial pressure in the range from about 10 to about 220 bar and a liquid hourly space velocity (LHSV) in the range from about 0.1 to about 10 $hr^{-1}$.

6. A method according to claim 1, wherein the oxygenate feedstock is contacted with the catalyst composition in the presence of hydrogen sulphide ($H_2S$) or a precursor thereof, such that the hydrogen sulphide is present in the hydrogen gas in an amount between about 10 ppm and about 1000 ppm.

7. A method according to claim 6, wherein the hydrogen sulphide is present in the hydrogen gas in an amount between about 10ppm and about 1000ppm.

8. A method according to claim 1, wherein the alumina carrier of the catalyst composition comprises less than about 0.5 wt. % silicon and less than about 0.5 wt. % phosphorous.

9. A method according to claim 1, wherein the alumina carrier of the catalyst composition has a mean pore diameter in the range from about 10 to about 20 nm.

10. A method according to claim 1, wherein the Group VIB metal of the catalyst composition comprises molybdenum (Mo).

11. A method according to claim 10, wherein the Group VIII metal of the catalyst composition comprises nickel (Ni).

12. A method according to claim 10, wherein the active metal component of the catalyst composition comprises from about 10 to about 18 wt. % molybdenum.

13. A method according to claim 11, wherein the active metal component of the catalyst composition comprises from about 2 to about 5 wt. % nickel.

14. A method according to claim 13, wherein the active metal component of the catalyst composition is characterized by a weight ratio of Mo / Ni in the range from about 4:1 to about 2:1.

* * * * *